(12) United States Patent
Schneider

(10) Patent No.: US 6,944,658 B1
(45) Date of Patent: Sep. 13, 2005

(54) CONTENT NOTIFICATION METHOD, PRODUCT, AND APPARATUS

(76) Inventor: Eric Schneider, 13944 Cedar Rd. #258, Univ Hts., OH (US) 44118

( * ) Notice: Subject to any disclaimer, the term of this patent is extended or adjusted under 35 U.S.C. 154(b) by 633 days.

(21) Appl. No.: 09/663,094

(22) Filed: Sep. 15, 2000

Related U.S. Application Data

(60) Provisional application No. 60/154,411, filed on Sep. 17, 1999.

(51) Int. Cl.$^7$ ............................................. G06F 15/173
(52) U.S. Cl. ........................ 709/224; 709/203; 709/223
(58) Field of Search ............................... 709/225, 224, 709/226, 206, 104, 203, 204, 223; 710/200; 379/88.12; 358/400; 707/10; 705/1

(56) References Cited

U.S. PATENT DOCUMENTS

| | | | | |
|---|---|---|---|---|
| 5,109,486 A | * | 4/1992 | Seymour | 709/224 |
| 5,404,231 A | * | 4/1995 | Bloomfield | 358/400 |
| 5,790,790 A | * | 8/1998 | Smith et al. | 709/206 |
| 5,813,007 A | * | 9/1998 | Nielsen | 707/10 |
| 5,933,604 A | * | 8/1999 | Inakoshi | 709/226 |
| 5,978,828 A | * | 11/1999 | Greer et al. | 709/224 |
| 5,995,594 A | * | 11/1999 | Shaffer et al. | 379/88.12 |
| 6,003,061 A | * | 12/1999 | Jones et al. | 709/104 |
| 6,038,601 A | * | 3/2000 | Lambert et al. | 709/226 |
| 6,105,098 A | * | 8/2000 | Ninose et al. | 710/200 |
| 6,332,141 B2 | * | 12/2001 | Gonzalez et al. | 707/10 |
| 6,502,132 B1 | * | 12/2002 | Kumano et al. | 709/224 |
| 6,513,060 B1 | * | 1/2003 | Nixon et al. | 709/203 |
| 6,519,568 B1 | * | 2/2003 | Harvey et al. | 705/1 |
| 6,654,746 B1 | * | 11/2003 | Wong et al. | 707/10 |
| 2002/0156800 A1 | * | 10/2002 | Ong | 707/203 |

OTHER PUBLICATIONS

T. Berners-Lee et al, Uniform Resouce Identifiers (URI): Gener Syntax, Network Working Group, Xerox Corporation, Aug. 1998. http://www.ietf.org/rfc/rfc2396.txt.*

* cited by examiner

*Primary Examiner*—Ario Etienne
*Assistant Examiner*—Ben Bruckart

(57) ABSTRACT

When it is determined that a resource corresponding to the identifier is accessible, the resource may then be accessed. When the resource is not accessible, then it may be determined whether an expected date/time range indicating when identifier may exist can be retrieved. When a date/time range cannot be retrieved, then it may be determined whether an expected date/time range may be generated from the identifier. If so, then a date/time range for the identifier may be generated. When the date/time range cannot be generated, then at least a start time may be provided to determine existence of a resource corresponding to the identifier. When a date/time range is retrieved, generated, or provided then a delay interval to check for existence of a resource corresponding to the identifier may be determined. It may then be determined whether to determine whether there a resource corresponding to the identifier may exist. If so, then it may be determined whether the current date/time is within the date/time range of identifier to make the determination as to whether the resource corresponding to the identifier exists. When the current date/time is within the date/time range and it is determined that a resource corresponding to the identifier is accessible, the resource may then be accessed.

18 Claims, 10 Drawing Sheets

---

ENTER SERVER AND DIRECTORY PATH TO FIND EXPECTED NEW URL

[ newfile.com ]    [ /weekly/update ]

OPTIONALLY ENTER THE EXPECTED FILENAME

[ 99week35.zip ]

ENTER APPROXIMATE DATE/TIME RANGE TO FIND NEW URL

| Publish Interval | Start Date | Start Time | End Time | | Poll Interval |
|---|---|---|---|---|---|
| Weekly ▼ | 8/31/99 | 9am | 5pm | 15 | Minutes ▼ |
| Hourly | | | | | Seconds |
| Daily | End Date | | | | Hours |
| Monthly | 9/1/99 | 9am | 5pm | | Days |

ENTER NOTIFICATION METHOD AND ADDRESS

[ E-mail ]  [ patents@update.com ]   ( OK )  ( Cancel )

| Server: ftp.uspto.gov | | | Path: /pub/pubdata/1999 | | |
|---|---|---|---|---|---|
| | | | File Size | Date/Time | Filename |
| -rw-r--r-- | 1 101 | 80 | 1841 | Aug 10 10:06 | 99week32.rpt |
| -rw-r--r-- | 1 101 | 80 | 29720 | Aug 10 10:06 | 99week32.txt |
| -rw-r--r-- | 1 101 | 80 | 3883543 | Aug 10 10:06 | 99week32.zip |
| -rw-r--r-- | 1 101 | 80 | 1199 | Aug 17 11:45 | 99week33.rpt |
| -rw-r--r-- | 1 101 | 80 | 29440 | Aug 17 11:45 | 99week33.txt |
| -rw-r--r-- | 1 101 | 80 | 378656 | Aug 17 11:46 | 99week33.zip |
| -rw-r--r-- | 1 101 | 80 | 898 | Aug 24 13:37 | 99week34.rpt |
| -rw-r--r-- | 1 101 | 80 | 24104 | Aug 24 13:37 | 99week34.txt |
| -rw-r--r-- | 1 101 | 80 | 3128072 | Aug 24 13:38 | 99week34.zip |

*Fig. 6a*

| Server: ftp.uspto.gov | | | Path: /pub/pubdata/1999 | | |
|---|---|---|---|---|---|
| | | | File Size | Date/Time | Filename |
| -rw-r--r-- | 1 101 | 80 | 1841 | Aug 10 10:06 | 99week32.rpt |
| -rw-r--r-- | 1 101 | 80 | 29720 | Aug 10 10:06 | 99week32.txt |
| -rw-r--r-- | 1 101 | 80 | 3883543 | Aug 10 10:06 | 99week32.zip |
| -rw-r--r-- | 1 101 | 80 | 1199 | Aug 17 11:45 | 99week33.rpt |
| -rw-r--r-- | 1 101 | 80 | 29440 | Aug 17 11:45 | 99week33.txt |
| -rw-r--r-- | 1 101 | 80 | 378656 | Aug 17 11:46 | 99week33.zip |
| -rw-r--r-- | 1 101 | 80 | 898 | Aug 24 13:37 | 99week34.rpt |
| -rw-r--r-- | 1 101 | 80 | 24104 | Aug 24 13:37 | 99week34.txt |
| -rw-r--r-- | 1 101 | 80 | 3128072 | Aug 24 13:38 | 99week34.zip |
| -rw-r--r-- | 1 101 | 80 | 1216 | Aug 31 10:31 | 99week35.rpt |
| -rw-r--r-- | 1 101 | 80 | 26104 | Aug 31 10:31 | 99week35.txt |
| -rw-r--r-- | 1 101 | 80 | 3296516 | Aug 31 10:32 | 99week35.zip |

*Fig. 6b*

| -rw-r--r-- | 1 101 | 80 | 1216 | Aug 31 10:31 | 99week35.rpt |
|---|---|---|---|---|---|
| -rw-r--r-- | 1 101 | 80 | 26104 | Aug 31 10:31 | 99week35.txt |
| -rw-r--r-- | 1 101 | 80 | 3296516 | Aug 31 10:32 | 99week35.zip |

*Fig. 6c*

```
<HTML><BODY><HR>
<A HREF="ftp://ftp.uspto.gov/pub/pubdata/1999/99week35.rpt">99week35.rpt</A><BR>
<A HREF="ftp://ftp.uspto.gov/pub/pubdata/1999/99week35.txt">99week35.txt</A><BR>
<A HREF="ftp://ftp.uspto.gov/pub/pubdata/1999/99week35.zip">99week35.zip</A><BR>
<HR></BODY></HTML>
```

*Fig. 6d*

ENTER SERVER AND DIRECTORY PATH TO FIND EXPECTED NEW URL

| newfile.com | /weekly/update |

OPTIONALLY ENTER THE EXPECTED FILENAME

| 99week35.zip |

ENTER APPROXIMATE DATE/TIME RANGE TO FIND NEW URL

| Publish Interval | Start Date | Start Time | End Time | | Poll Interval |
|---|---|---|---|---|---|
| Weekly ▼ | 8/31/99 | 9am | 5pm | 15 | Minutes ▼ |
| Hourly | | | | | Seconds |
| Daily | End Date | | | | Hours |
| Monthly | 9/1/99 | 9am | 5pm | | Days |

ENTER NOTIFICATION METHOD AND ADDRESS

| E-mail | patents@update.com | OK | Cancel |

*Fig. 7a*

| Server | newfile.com | anotherfile.com |
|---|---|---|
| Path | /weekly/update | /daily/update |
| Filename | 99week35.zip | anotherweek.zip |
| Publish Interval | Weekly | Daily |
| Start Day | Tuesday | 9/7/99 |
| End Day | Wednesday | |
| Start Time | 9am | 12pm |
| End Time | 5pm | 5pm |
| Poll Interval | 15 minutes | 5 minutes |
| Notify Method | E-mail | Phone |
| Notify Address | patents@update.com | 216-555-1212 |

*Fig. 7b*

CONTENT NOTIFICATION METHOD, PRODUCT, AND APPARATUS

CROSS REFERENCE TO RELATED APPLICATIONS

This application for patent claims priority of U.S. Provisional Application Ser. No. 60/154,411 filed Sep. 17, 1999, by Schneider, which is herby, incorporated by reference.

The application for patent is also related to applications and claims the benefit of:

U.S. Pat. No. 6,442,549 filed Nov. 15, 1999, by Schneider et al; and

U.S. Pat. No. 5,987,464 filed Jul. 25, 1997, by Schneider, which are hereby incorporated by reference.

FIELD OF THE INVENTION

This invention generally relates to notification systems, and more specifically relates to a method, product, and apparatus for resource notification.

BACKGROUND OF THE INVENTION

The Internet is a vast computer network consisting of many smaller networks that span the entire world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may issue the data and a client computer displays or processes it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which is be used as a query to access a database server and generate an HTML web page with customized data results as output that is passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed. Hosts running special servers provide the Web pages. Software that runs these Web servers is relatively simple and is available on a wide range of computer platforms including PC's. Equally available is a form of client software, known as a Web browser, which is used to display Web pages as well as traditional non-Web files on the client system.

A network resource identifier such as a Uniform Resource Identifier (URI) is a compact string of characters for identifying an abstract or physical resource. URIs are the generic set of all names and addresses that refer to objects on the Internet. URIs that refer to objects accessed with existing protocols are known as Uniform Resource Locators (URLs). A URL is the address of a file accessible on the Internet. The URL contains the name of the protocol required to access the resource, a domain name, or IP address that identifies a specific computer on the Internet, and a hierarchical description of a file location on the computer. For example the URL "http://www.example.com/index.html", where "http" is the scheme or protocol, "www.example.com" is the Fully Qualified Domain Name (FQDN), and "index.html" is the filename located on the server.

As new information is periodically published on a network such as the Internet, a common method for updating a user, subscriber, or client system of such information is to send notification to the subscriber from the source of the update. However, there are many sources that publish new or updated information only and make no acknowledgment of the newly available information. For instance, it is the responsibility of government to disseminate public information. However it is not a requirement for government to advertise or market such publications creating opportunity for the private sector to take initiative and add value to public information by repackaging, advertising, marketing, or further distributing such information. As government information is released periodically into the public domain, it is upon the public to periodically check exactly when the new information has been updated.

This applies to any information that is released or updated that puts a burden on those interested in such new information, particularly to such information made newly available over a network. A user must initiate periodic requests to see if and when a new update is available. An inherent problem with the Internet is that the available information is distributed through a "pull" type infrastructure, where the user who wants to receive information must manually search sites of interest, or use a finder application, to search and download appropriate information. Listed below are improvements to this type of "pull" methodology.

Netscape improved HTML language to extend the use of the META tag to constantly refresh a resource for a given time interval.

<META HTTP-EQUIV="Refresh" CONTENT="60; URL=http://example.com/news.htm">

This META tag instructs the client browser to retrieve a file called "news.htm" from a server called "example.com" every 60 seconds. Though information can be automatically updated, this improvement only applies to the current URL and is known as a "periodic pull" method, which is still not truly a "push" method of information retrieval. Listed below are examples of how a "push" method is used for notification.

U.S. Pat. No. 5,790,790 issued on Aug. 4, 1998, by Smith, et al. and assigned to Tumbleweed Software Corporation, which is entitled, "Electronic document delivery system in which notification of said electronic document is sent to a recipient thereof" is a system that controls the delivery of portable documents from a sender to a large number of recipients, using a network of servers that route the documents and notifications in a store and forward manner, while providing routing and accounting information back to the sender. However, the '790 patent relies on the intent for a provider to notify a subscriber, which does not solve the problem of providers who do not make attempts at notification.

U.S. Pat. No. 5,933,604 issued on Aug. 3, 1999, by Inakoshi and assigned to Fujitsu Limited, which is entitled, "Network resource monitoring system and method for providing notice of changes in resources in a network" is a system that periodically accesses a resource such as a home page to detect when the existing resource has been updated and then notifies a user of such a change. However, the '604 patent relies on monitoring existing resources only and does not contemplate the monitoring of resources which do not yet exist or intermittently exist.

The prior art clearly demonstrates the need for a system to notify users of new resources that do not exist as of yet. Accordingly, in light of the above, there is a strong need in the art for a system to notify users when new resources are available on a network regardless of whether the publishing source of such a resource notifies the user.

SUMMARY OF THE INVENTION

Briefly, this invention relates to a method and apparatus for notifying users of new resources. The present invention removes the burden of the user from periodically checking when a new resource is published. The invention enables notification to be "pushed" to a subscriber wherein the content of the notification is used to access a given resource. The present invention enables hyperlink generation by extracting the difference from two files wherein such hyperlinks may access a new resource when activated. The invention allows a user to submit a request to enable reception of periodic updates of new resources indefinitely. The present provides notification of intermittent resources.

In general, in accordance with the present invention a method for notifying when an inaccessible resource corresponding to an identifier becomes accessible includes the steps of determining a starting time, determining whether a current time exceeds the starting time, intermittently determining whether the resource corresponding to the identifier is accessible until a condition is performed in response to determining that the current time exceeds the starting time, and providing notification including an access means for accessing the resource in response to determining that the resource corresponding to the identifier is accessible. The identifier may be a URI and the resource corresponding to the identifier may not exist or exist intermittently. The determination of the starting time may further include the step of selecting a time access method from one of a retrieval method, generation method, and input method.

The generation method may further include the step of generating the starting time from the identifier. The retrieval method may include the step of retrieving the starting time from user modifiable configuration settings. The determination of whether the resource corresponding to the identifier is accessible may further include the step of transmitting a resource access request to the resource. The resource access request may also include a differencing resource method. The differencing resource method may further include the step of comparing the difference from one of a plurality of file dates, file sizes, and number of file counts from a directory.

The access means for accessing the resource may further include the step of selecting the access means from one of a hyperlink access and automatic access. Hyperlink access may further include the step of selecting the hyperlink from one of a hyperlink determination method, hyperlink retrieval method, and hyperlink generation method. The hyperlink determination method may further include the steps of selecting the differencing resource method, generating at least one hyperlink corresponding to the accessible resource from the differencing resource method selection, and providing the notification having the hyperlink. Providing notification may further include the step of selecting a notification method corresponding to a subscriber. The notification method may further include the step of selecting a notification destination from one of a pager, e-mail, web page, television, phone, fax, instant message, and conferencing.

In accordance with yet additional aspects of the present invention, an apparatus which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF THE DRAWINGS

FIG. 6a is an illustration depicting directory content retrieved in accordance with the present invention.

FIG. 6b is another illustration depicting directory content retrieved in accordance with the present invention.

FIG. 6c is an illustration depicting the difference between the retrieved content shown in FIG. 6a and FIG. 6b in accordance with the present invention.

FIG. 6d is an illustration depicting a generated web page of hyperlinks in accordance with the present invention.

FIG. 7a is an illustration depicting the program interface for determining what and how to notify a subscriber in accordance with the present invention.

FIG. 7b presents an exemplary table in accordance with the present invention illustrating a data structure that corresponds to data entered from the user interface.

DETAILED DESCRIPTION OF THE INVENTION

Figure 1A:
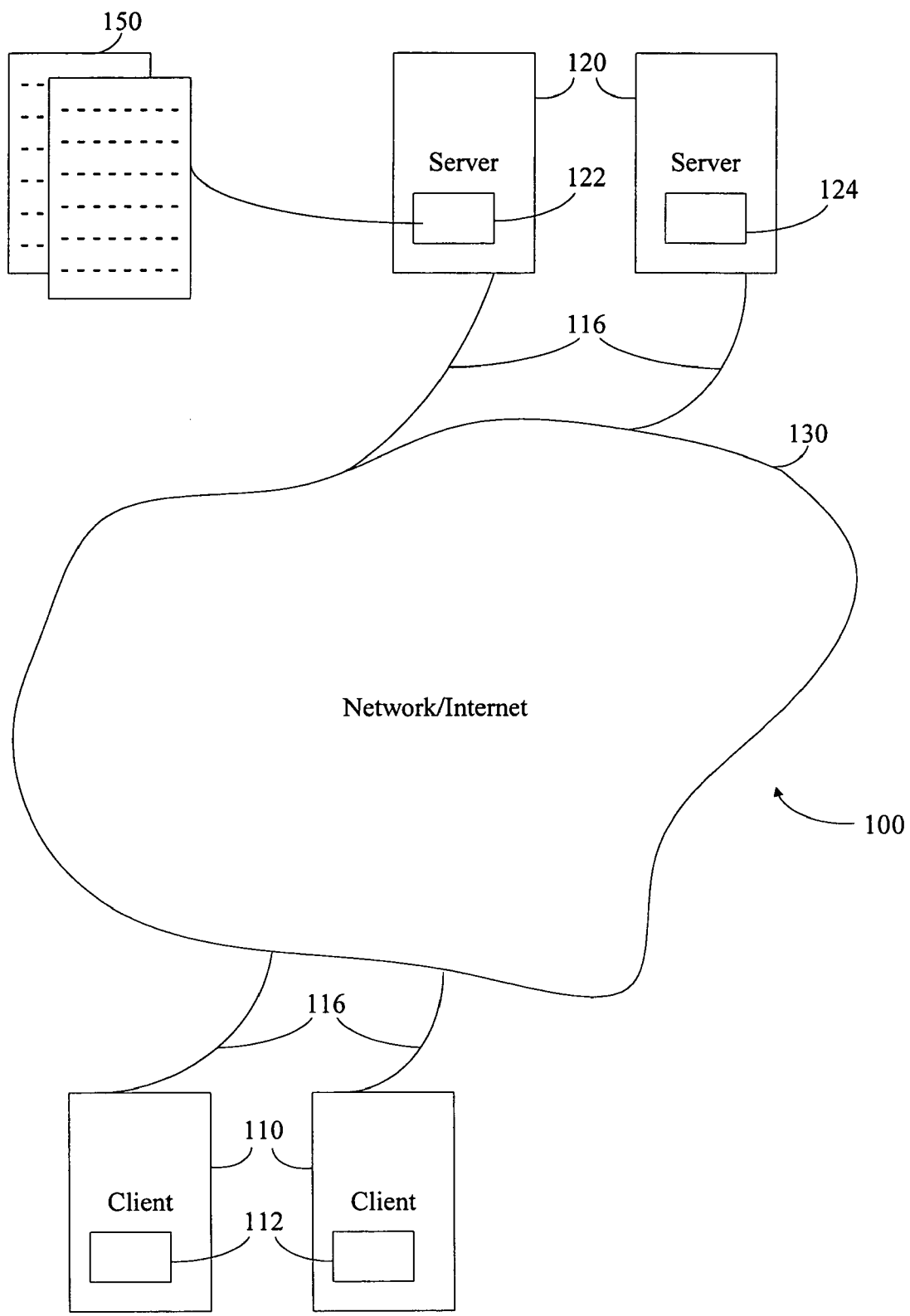
FIG. 1a is a block diagram of an exemplary distributed computer system in accordance with the present invention.

The present invention will now be described with reference to the drawings, wherein like reference numerals are used to refer to like elements throughout.

Turning first to the nomenclature of the specification, the detailed description that follows represents processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

FIG. 1a illustrates an exemplary system for providing a distributed computer system 100 in accordance with one aspect of the present invention and includes client computers or any network access apparatus 110 connected to server computers 120 via a network 130. The network 130 may use Internet communications protocols (IP) to allow clients 110 to communicate with servers 120. The communication device of a network access apparatus 110 may include a transceiver, a modem, a network interface card, or other interface devices to communicate with the electronic network 130. The network access apparatus 110 may be operatively coupled to and/or include a Global Positioning System (GPS). The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, an internet television, a set top box, a web-enabled telephone, an internet appliance, a portable wireless device, a game player, a video recorder, and/or an audio component, for example.

Each client 110 typically includes one or more processors 166, memories 168, and input/output devices 170. An input device may be any suitable device for the user to give input to client computer system 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. Although client computers 110 are shown separate from the server computers 120, it is understood that a single computer might perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1B:
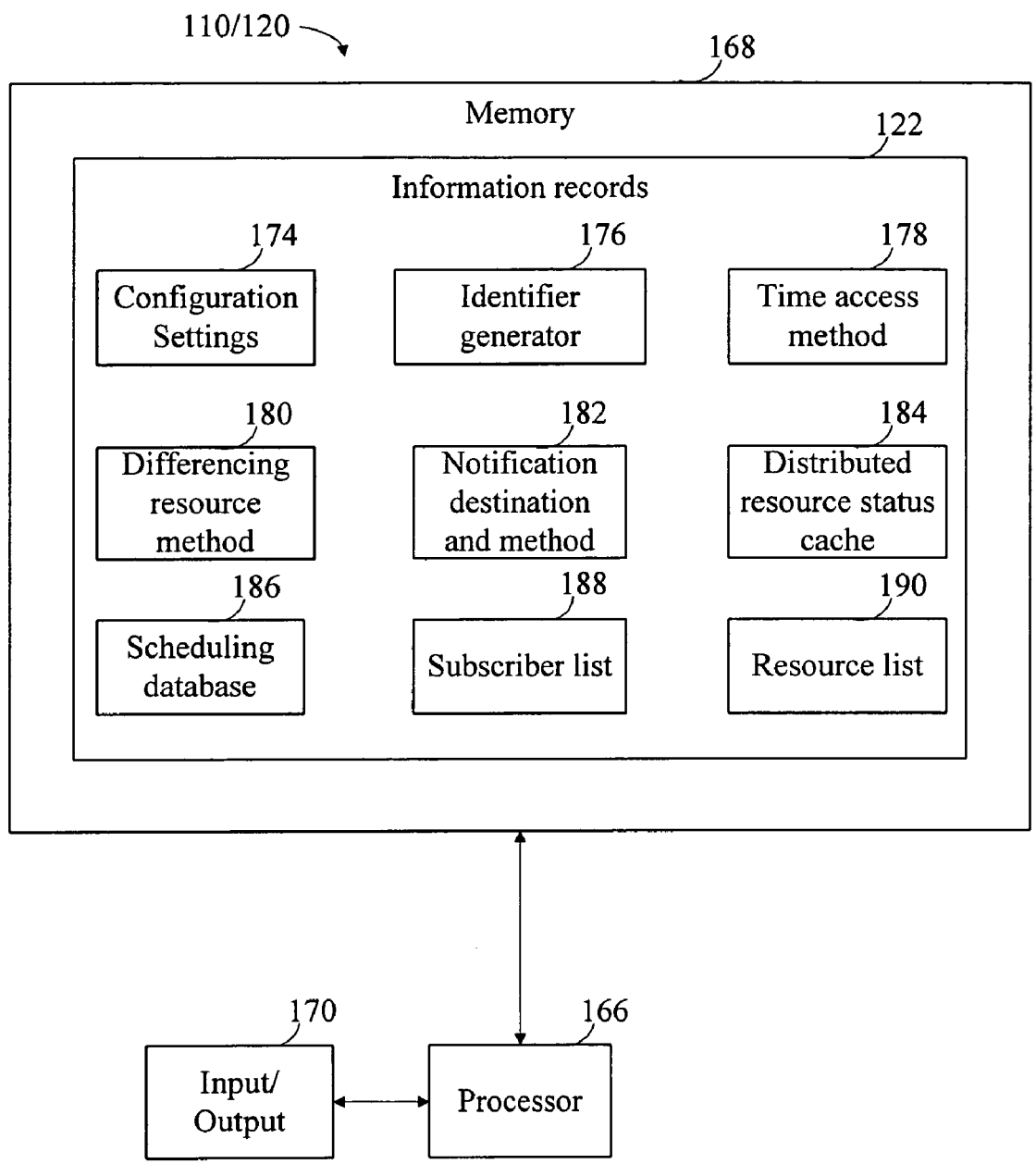
FIG. 1b is a block diagram illustrating exemplary information records stored in memory in accordance with the present invention.

FIG. 1b illustrates a block diagram of a storage device such as memory 168 in operative association with a processor 166. The processor 166 is operatively coupled to input/output devices 170 in a client 110 and/or server 120 computing system. Stored in memory 168 may be information records 122 having any combination of exemplary content such as lists, files, and databases. Such records may include for example: user modifiable configuration settings 174, identifier generator 176, time access method 178, differencing resource method 180, notification destination and method 182, distributed resource status cache 184, scheduling database 186, subscriber list 188, and resource list 190. These information records may be further introduced and discussed in more detail throughout the disclosure of this invention.

Figure 2A:
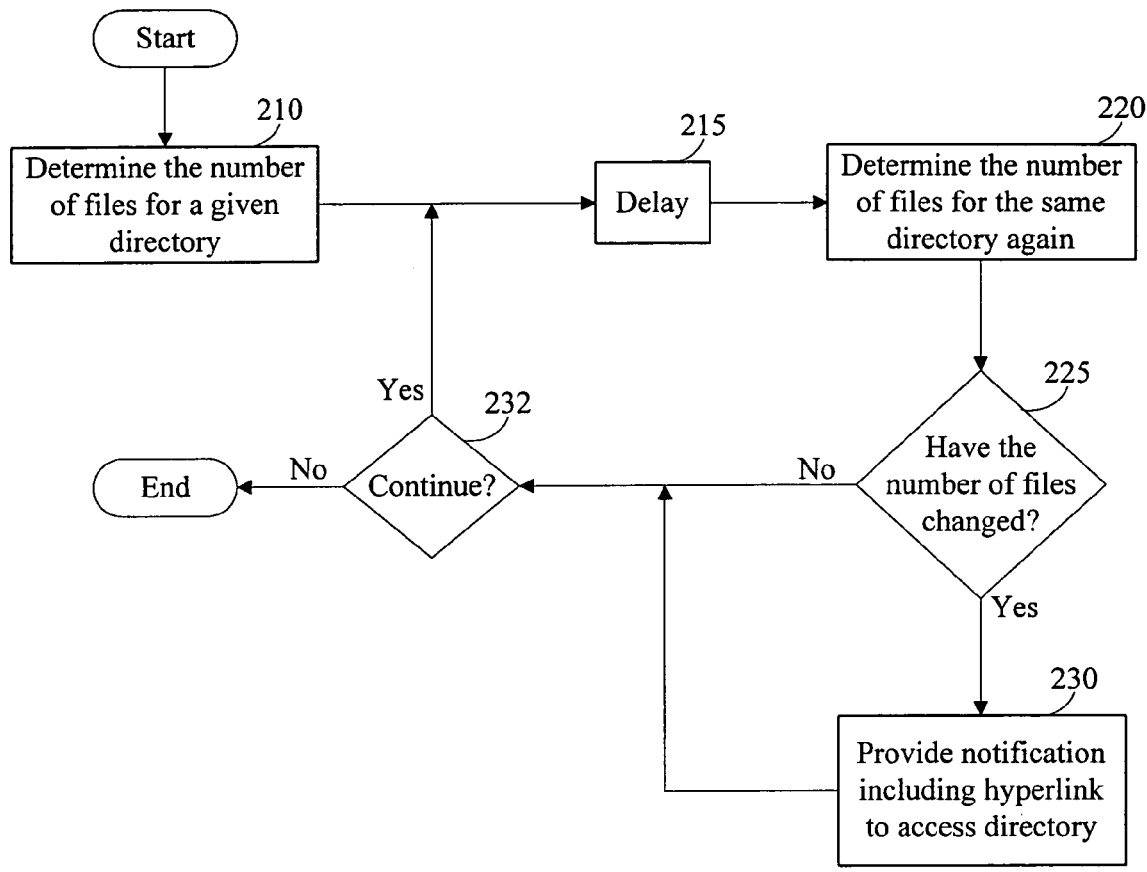
FIG. 2a is a flowchart illustrating the steps performed for determining and notifying when a new resource is available in accordance with the present invention.

FIG. 2a illustrates the steps performed for determining and notifying when a new resource is available. A program may be automatically executed upon booting an operating system of a network accessible device 110 to determine the number of files for a given directory in step 210 and waits in step 215 for a configured predetermined interval of zero or more seconds before determining in step 220 the number of files for the same directory again. The predetermined interval may be retrieved from configuration settings 174. The program may then determine from the two most previously determined values in step 225 whether the number of files in the directory has changed. When the number of files have changed, then notification may be provided in step 230 to a configurable predetermined user/subscriber or group of users/subscribers that the given directory has been modified. Subscriber information may be retrieved by consulting a subscriber list 188.

After notification (step 230) or when no files have changed (step 220), it may then be determined in step 232 whether to continue program. If so, then the program may terminate otherwise steps (215, 220) may be repeated until it is determined that the number of files have changed. Included in the notification may be a link to retrieve the current content of the given directory on a computing system connected to a network. The method of notification is also configurable as will be shown by the present invention. The present invention does not rely upon the network device 110 to be connected to the network 130. The given directory may also be for any given directory within the file structure of the network device 110.

Figure 2B:
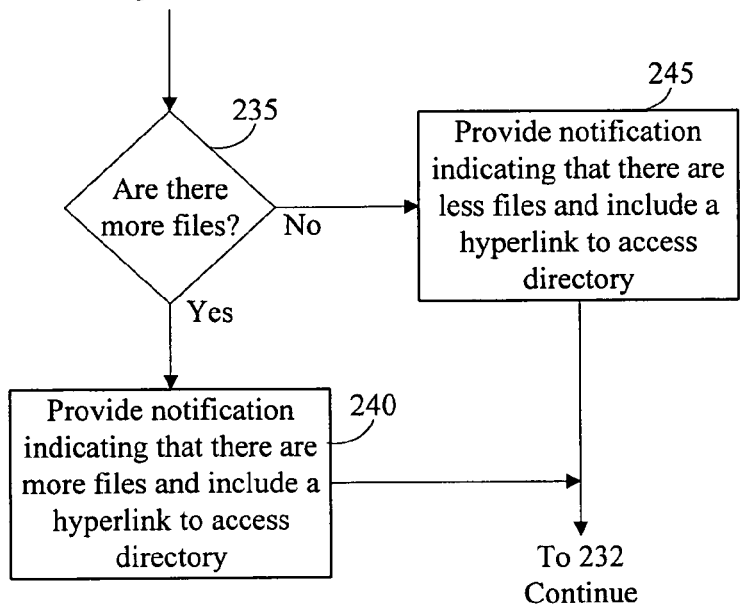
FIG. 2b is a flowchart illustrating the steps performed for providing specific notification in accordance with the present invention.

FIG. 2b illustrates how more specific notification may be provided as discussed in FIG. 2a. A differencing resource method 180 may be retrieved and employed to determine whether the number of files has changed. When it is determined that the number of files have changed (step 225), it may be further determined in step 235 whether files have been added or deleted by comparing the two most recent values for the number of files. Notification may be provided by consulting from a notification destination and method 182 to more specifically reflect this fact. When it is determined in step 225 that there are more files, notification may be provided in step 240 indicating that there are more files including a hyperlink to access the directory. When it is determined that there are less files, notification may then be provided in step 245 indicating that there are less files including a hyperlink to access the directory. In either case, it may then be determined in step 232 whether to continue program.

Figure 3A:
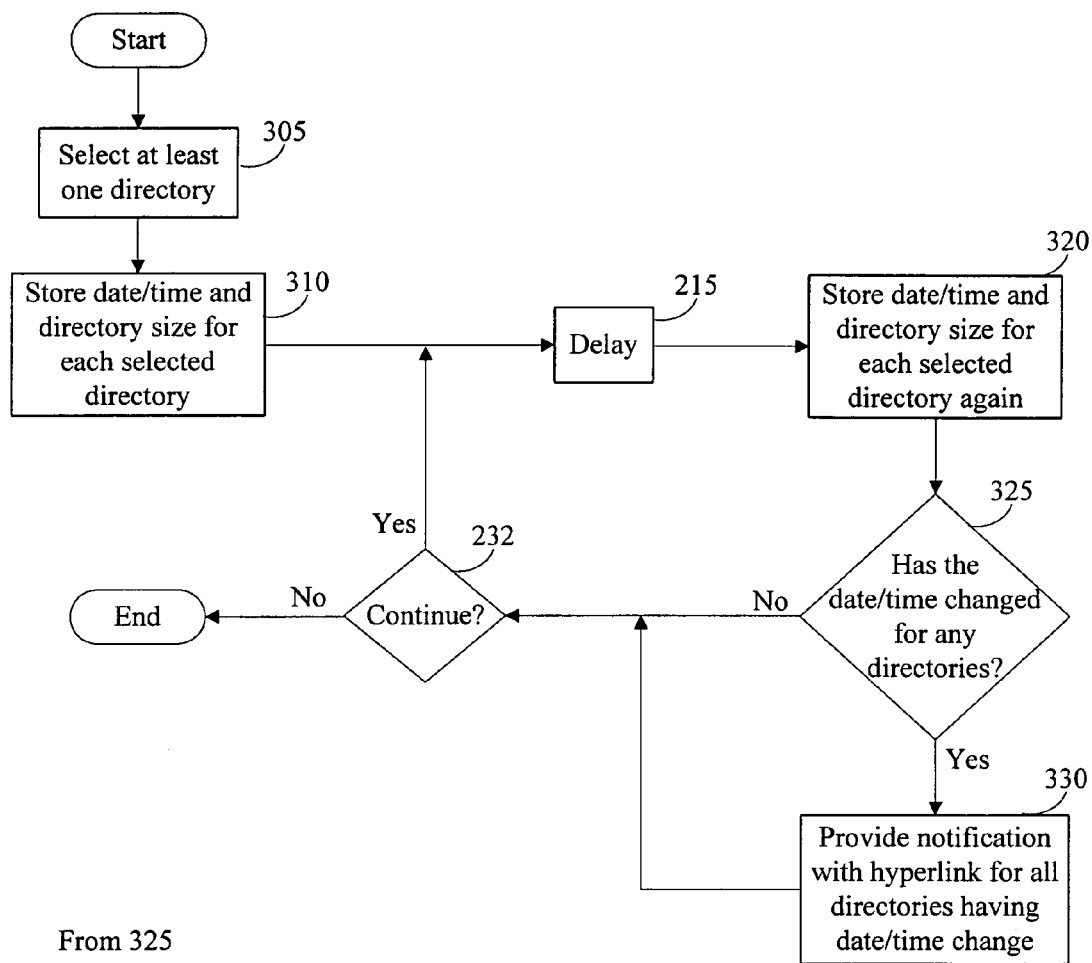
FIG. 3a is a flowchart illustrating the steps performed for determining and notifying when a new resource is available in accordance with another aspect of the present invention.

FIG. 3a also illustrates the steps performed for determining and notifying when a new resource is available. A program may be automatically executed upon booting an operating system of a network accessible device 110 and select in step 305 at least one directory for analysis. The date/time and directory size is stored in step 310, for each selected directory and waits in step 215 for a configured predetermined interval of zero or more seconds before determining in step 325 whether there is a change in the two most previously determined date/time values. When the date/time values have changed for any of the selected directories, then notification may be provided in step 330 to a configurable predetermined user/subscriber or group of users/subscribers that the selected directory has been modified. Included in the notification is a link to access the current content of the given directory. After notification (step 330) or when the date/time values have not changed (step 320), it may then be determined in step 232 whether to continue program. If so, then the program may terminate otherwise steps (315, 320) may be repeated until it is determined that the date/time values have changed.

Figure 3B:
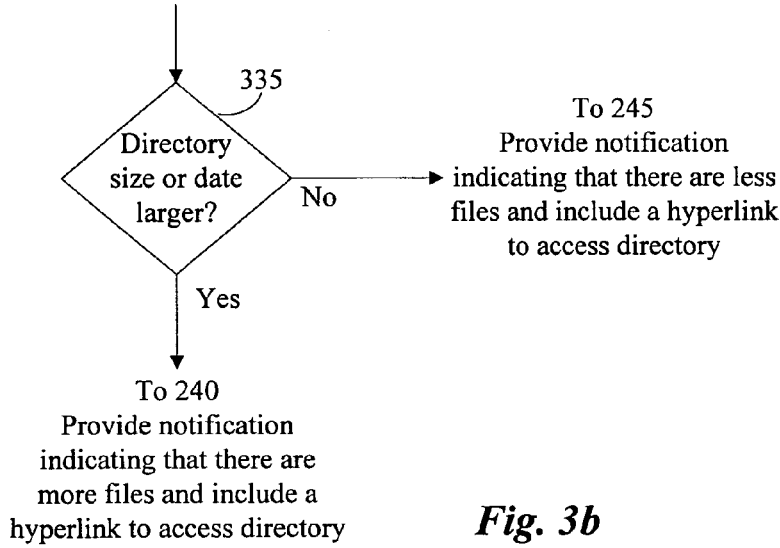
FIG. 3b is a flowchart illustrating the steps performed for providing specific notification in accordance with another aspect of the present invention.

FIG. 3b illustrates steps of how more specific notification may be provided as discussed in FIG. 3a. A differencing resource method 180 may be retrieved and employed to determine whether date/time values have changed. When it is determined that the date/time values have changed (step 325), it may further be determined in step 335 whether files have been added or deleted by comparing directory size for each selected directory or by comparing the two most recent date/time values. Notification may be provided by consulting from a notification destination and method 182 to more specifically reflect this fact. When it is determined in step 335 that there are more files, notification may be provided in step 240 indicating that there are more files including a hyperlink to access the selected directory. When it is determined that there are less files, notification may be provided in step 245 indicating that there are less files including a hyperlink to access the selected directory.

Figure 4:
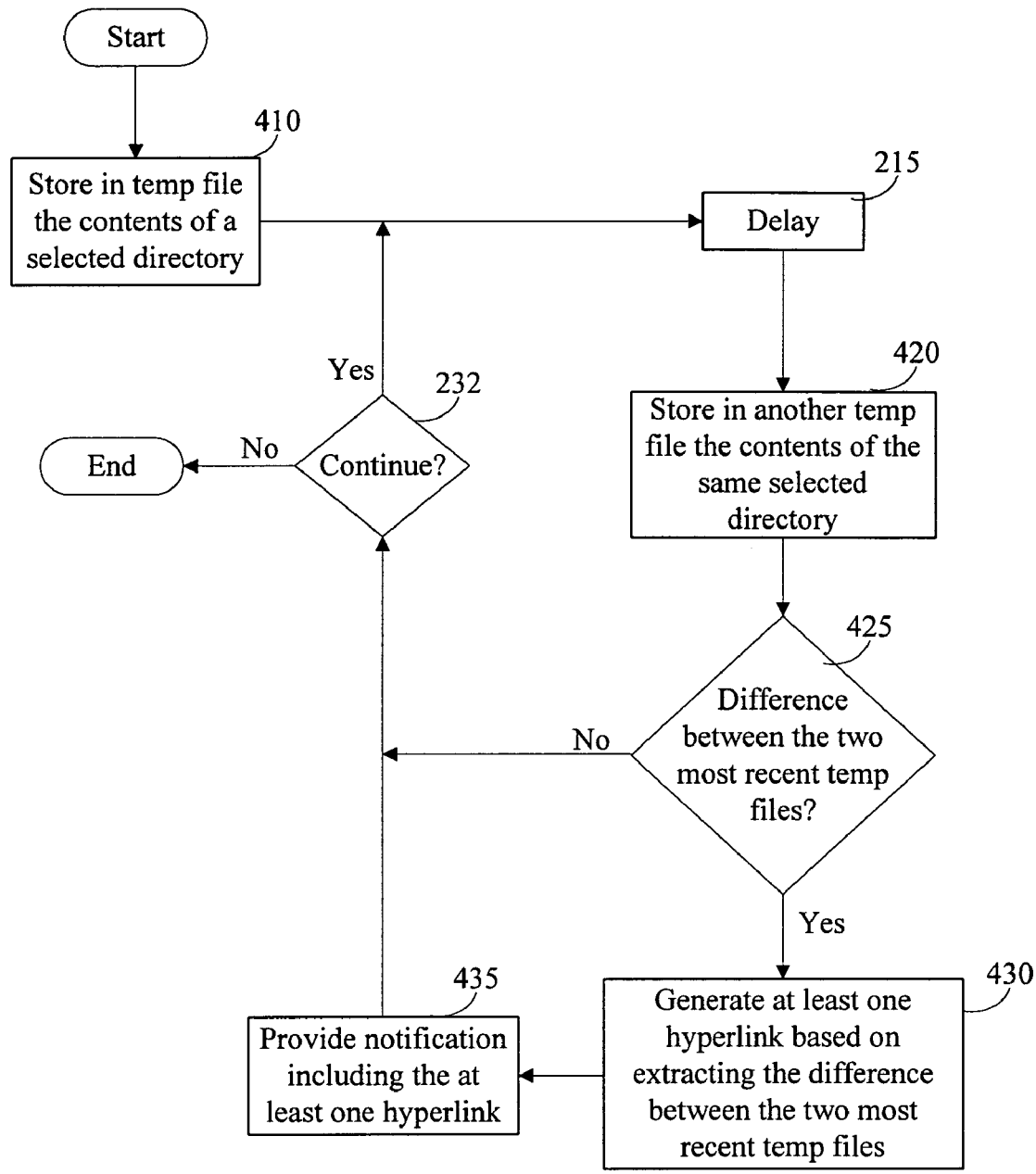
FIG. 4 is a flowchart illustrating the steps performed for generating hyperlinks from the difference of two files in accordance with the present invention.

FIG. 4 illustrates another aspect of how more specific notification may be provided. A program may be automatically executed upon booting the operating system of a network accessible device 110 to store the contents of a selected directory in a temp file in step 410 and wait in step 215 for a configured predetermined interval of zero or more seconds before storing the contents of the same selected directory in another temp file in step 420. The program may then determine in step 425 whether there is a difference between the two most recent temp files. When there is a difference then at least one hyperlink may be generated in step 430 based on extracting the difference between the two most recent temp files. Notification having the at least one hyperlink may then be provided in step 435 to a configurable predetermined user/subscriber or group of users/subscribers. After notification (step 435) or when the two most recent temp files are the same (step 420), it may then be determined in step 232 whether to continue program. If so, then the program may terminate otherwise steps (215, 420) may be repeated until it is determined that there is a difference between the two most recent temp files.

Other aspects as shown in FIGS. 2b, 3b may be combined with FIG. 4 to offer more variations of how this invention may be practiced. For example, notification may further provide whether the included links are new files added or recent files deleted. Also considered is the use of date/time values and file sizes to make the needed determinations illustrated in FIG. 4. For instance, rather than comparing the difference between two files, links of files included in the notification may be determined by generating links for all files that exceed a certain date/time value.

Figure 5:
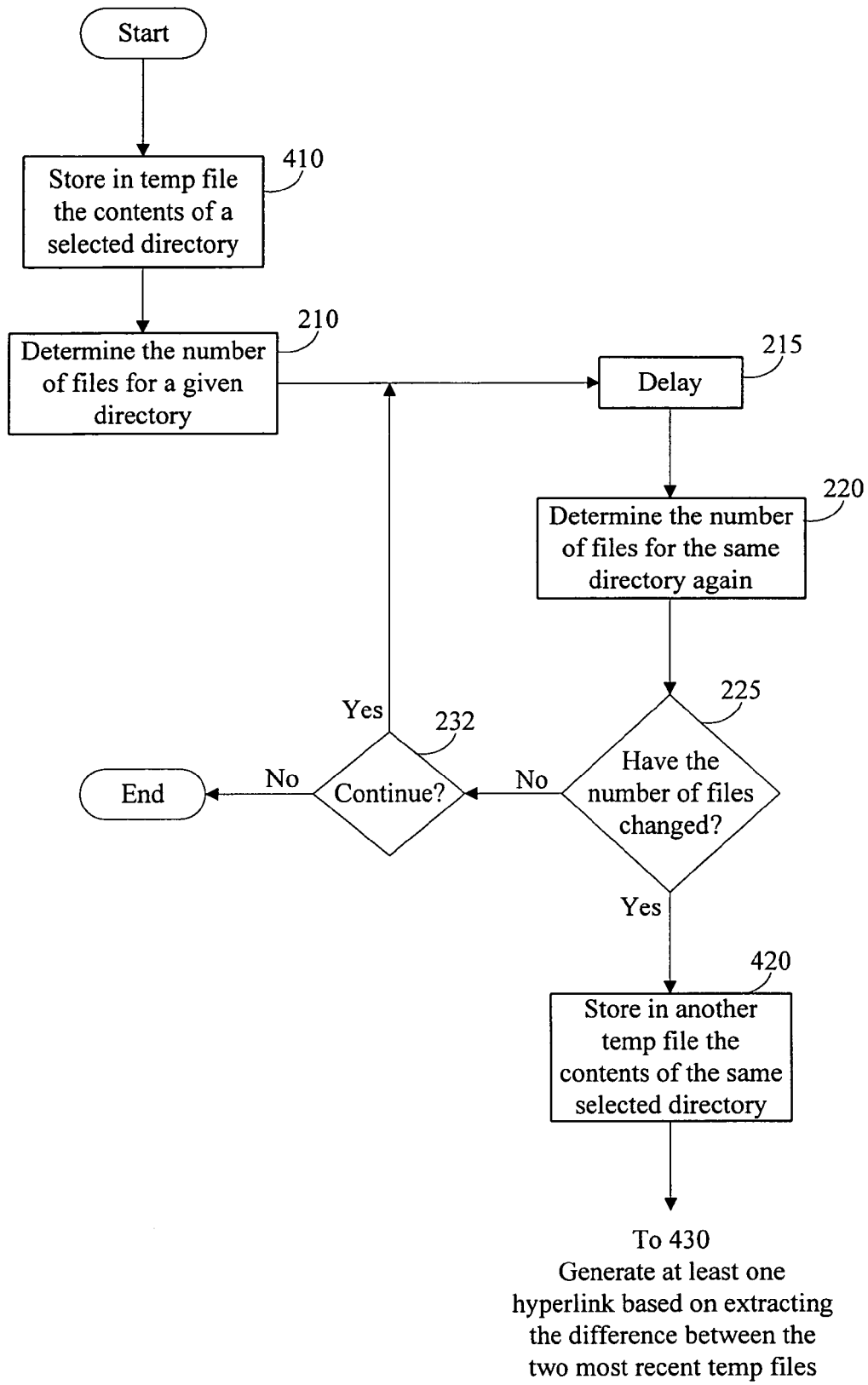
FIG. 5 is a flowchart illustrating the combining of steps illustrated in FIG. 2a and FIG. 4 in accordance with the present invention.

FIG. 5 illustrates how the steps of FIG. 2 and FIG. 4 may be combined to demonstrate another aspect of the present invention. A program may be automatically executed upon booting the operating system of a network accessible device 110 to store the content of a selected directory in a temp file in step 410, determine in step 210 the number of files for a selected directory and waits in step 215 for a configured predetermined interval before determining in step 220 the number of files for the selected directory again. It then may be determined in step 225 from the two most previously determined values, whether the number of files in the directory has changed. When the number of files have changed, the contents of the same selected directory may be stored in another temp file in step 420. At least one hyperlink may be generated in step 430 based on extracting the difference between the two most recent temp files. Notification having the at least one hyperlink may then be provided in step 435 to a configurable predetermined user/subscriber or group of users/subscribers. After notification (step 230) or when no files have changed (step 220), it may then be determined in step 232 whether to continue program. If so, then the program may terminate otherwise steps (215, 220) may be repeated until it is determined that the number of files have changed.

An example of the periodical release of information is raw data published each Tuesday on the USPTO FTP server connected to the Internet. U.S. Pat. No. 5,987,464 filed Jul. 25, 1997, by Schneider entitled "Method and apparatus for periodically updating data records having an expiry time", explains how the periodic release of information is prepared and processed. FIGS. 6a–d depict how hyperlinks may be generated based on the difference in directory contents as discussed in FIGS. 4–5. FIG. 6a illustrates the content of a selected directory on the USPTO FTP server. The files of the form "99weekXX.zip" represent raw front page data of newly issued USPTO patents that are released in print every Tuesday at noon. It is clear from the date/time listing that there are variations from week to week of exactly when the new file is published. May it also be noted that the USPTO has fulfilled its mission of publishing such information and is under no obligation to compete with the private sector by adding more value such as setting up a notification service to subscribers to inform a subscriber as to exactly when each new file is publicly released. It may be ascertained from the listing shown in FIG. 6a that the next expected file will be called "99 week35.zip" and published, sometime on Tuesday, Aug. 31, 1999 by 10:06 am or later or by 1:38 pm or earlier.

Like FIG. 6a, FIG. 6b also depicts the content of a selected directory on the USPTO FTP server. It is clear that the content of the same directory listed in FIG. 6a has changed by listing that the file "99 week35.zip" was published on Tuesday, Aug. 31, 1999 at 10:32 am. When the program as discussed in FIG. 4 or FIG. 5 is applied and stores the directory content (of FIG. 6a and FIG. 6b) as temp files, the content may then be compared to yield a new temp file illustrated in FIG. 6c, which represents the difference between the two previous temp files. The program may then generate a web page of hyperlinks as shown in FIG. 6d that represent the file locations found from the difference file shown in FIG. 6c. The three new files, one of which is "99 week35.zip" is provided to at least one subscriber via a notification method such as e-mail or the like with the attached web page. A generalized message informing the subscriber of the specific details of the notification may be listed including the date/time of the update and the attached file of hyperlinks to provide access or immediate retrieval of the published file eliminating the need for the subscriber to manually periodically check when the new file has been published.

FIG. 7a illustrates the interface for a subscriber to designate what directories and/or files may be monitored for notification. First, a server and directory path may be entered to determine where to find a new file or expected new URL. This designation may be made more specific by further entering the expected filename or URL. A publish interval may then be determined such as weekly, monthly, daily etc. Variations to user input may be to specify the interval of the periodical by entering a value per unit of time such as days, weeks, etc. Included in such variations is to provide the static portion of the URL and how it may be concatenated with the component that is time and/or date sensitive to eliminate specifying a new URL for each interval. Consider the example from FIG. 6a where a resource may be specified as follows:

URL="ftp://ftp.uspto.gov/pub/pubdata/1999/99week"+weeknum+".zip"

Where weeknum is a specified variable with an initial value that increments for the specified interval. In this case, for each week (the publishing interval), weeknum has an initial value of "35" (denoting the 35th week of the year) and may be incremented by the value of "1" for each new publication released for each week. By doing so, the subscriber may submit a request only once and receive periodic updates indefinitely.

Continuing with FIG. 7a, a start date and both start time and end time may be determined, followed by entering an end date including a start time and end time for the end date. A polling interval may then be specified by entering a value per unit of time such as seconds, minutes, hours, etc. It is possible to omit both the end time of the start date and the start time of the end date to specify a continuous interval that determines when the content of a selected directory has changed. By providing start/end date/time variables, resources are optimized and provide the best alternative for continuous monitoring or polling. A notification method and address may then be entered. Some methods for notifying a subscriber may include e-mail, pager, fax, ICQ#, Instant Message, telephone, or any other known notification method that also includes a corresponding notification identifier based on the selected notification method.

When scheduling is confirmed by the program interface then input may be stored accordingly in a database file to be used by the program when determining selected directories, etc. FIG. 7b illustrates the data structure of such a database (discussed more in FIG. 8). The data structure may include data for the server, path, filename, expected URL (not shown), publish interval, start day, end day, start time and end time (included for both start day and end day if necessary—not shown), poll interval, notify method, and notify address.

Figure 8:
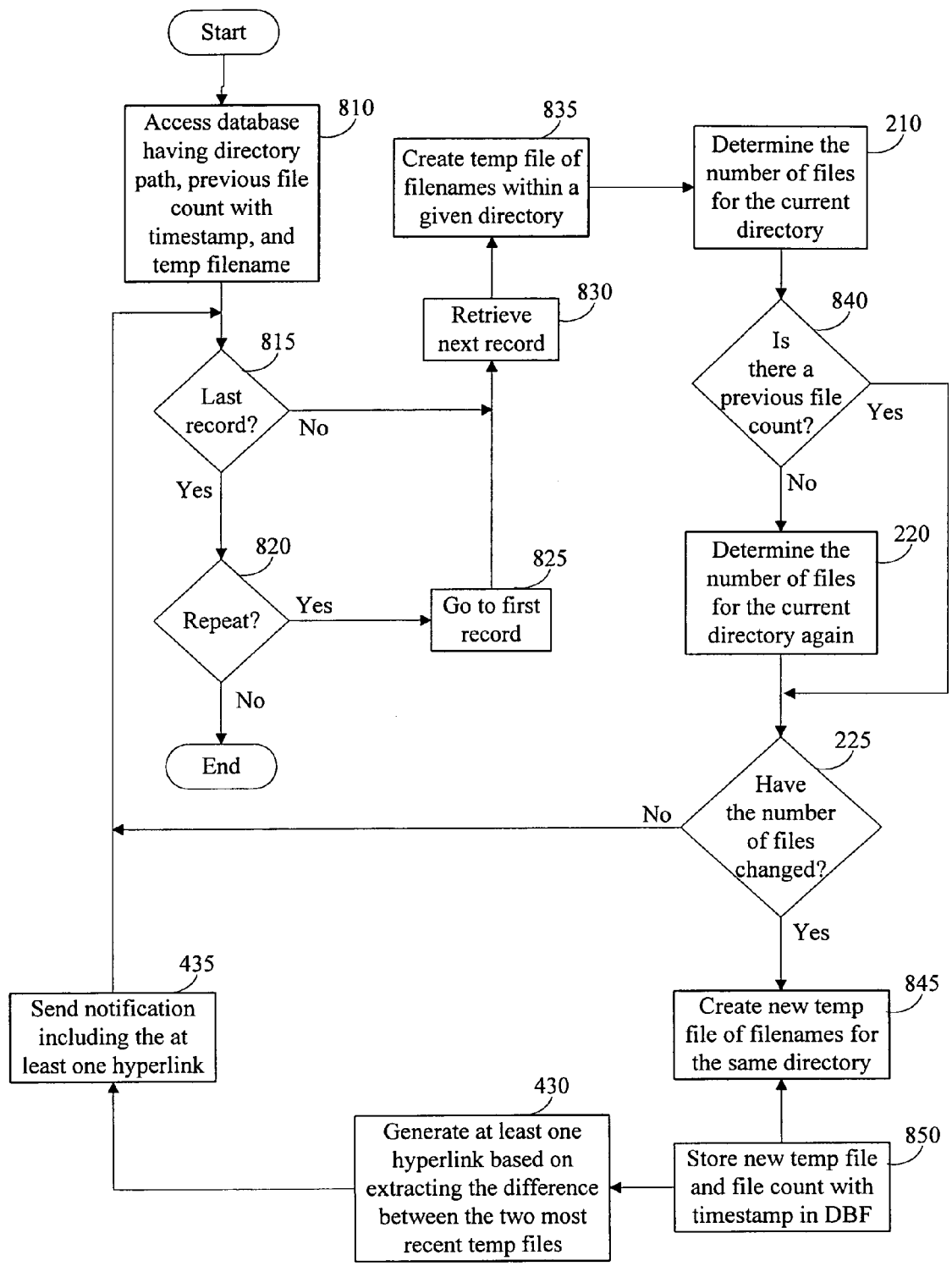
FIG. 8 is a flowchart illustrating the steps performed for automating the notification process for each subscriber request in accordance the present invention.

FIG. 8 applies the different teachings as discussed from previous illustrations to provide an automated system for notifying subscribers of new resources. A program may be executed upon the boot of an operating system of a network accessible device 110 to access in step 810 all configurable predetermined directories of subscriber requests from a database. The database may have a data structure (as illustrated in FIG. 7b) including server name, directory path, previous file count with timestamp, and temp filename, etc. Each data record represents at least one subscriber or user request. Data records may be retrieved in step 830 until the last data record of the database is accessed in step 815 (equivalent to EOF). It may then be determined in step 820 whether the retrieval process is to continue by accessing in step 825 the first data record (creating a circular database).

For each data record retrieved in step 830, a temp file may then be created in step 835 including the filenames of the given directory. The number of files may be determined in step 840 for the current directory. If there is a previous file count stored in the retrieved record then it may be determined whether the number of files has changed. However when there is no previous file count, the number of files for the current directory may be determined in step 220 again and then compared to determine whether the number of files have changed. If the number of files have changed, then the previous steps may be repeated until the last data record is reached and determined not to continue with the first data record, or when a change in the number of files have been detected. It is also understood that a variety of detection procedures may be applied (e.g., date/time change, file size change, etc.) as discussed in the previous drawings.

When there is a recorded change, a new temp file of filenames may be created in step 845 for the same directory. The new temp file and file count with timestamp, etc. may be stored in step 850 in the data record of the database. At least one hyperlink may be generated in step 430 based on extracting the difference between the two most recent temp files. Notification having the at least one hyperlink may then be provided in step 435 to a configurable predetermined user/subscriber or group of users/subscribers which is retrieved from the data record of the database. The previous steps may then be repeated until the last record is reached and it is determined not to continue with the first data record, or when another change in the number of files has been detected.

As discussed, the identifier may be a URI and the resource corresponding to the identifier may not exist or exist intermittently. There are times when sites are down due to maintenance, power outages, and the like where a distributed resource status cache 184 may be employed to provide notification of renewed resource accessibility. Updates may be propagated through a distributed system of hierarchical status caches 184 similar to that of how the DNS may be updated. These status caches 184 may be employed by notification service providers (NSPs) and the like for the purpose of minimizing network bandwidth. Furthermore, an identifier generator 176 may be used as part of a hyperlink generation method to provide identifiers. A time access method 178 may be selected by retrieving, generating, and/or inputting a date/time. The time may be generated from the components of the identifier (e.g., identifier is a URI having a volume number and issue number as part of the URI). The time may be retrieved from user modifiable configuration settings 174 and/or by consulting a scheduling database 186. A resource access request (e.g., HTTP HEAD request) may be used along with a differencing resource method 180 such as comparing the difference from one of a plurality of file dates, file sizes, and number of files counts from a directory. Each resource may be selected from a resource list 190.

Figure 9:
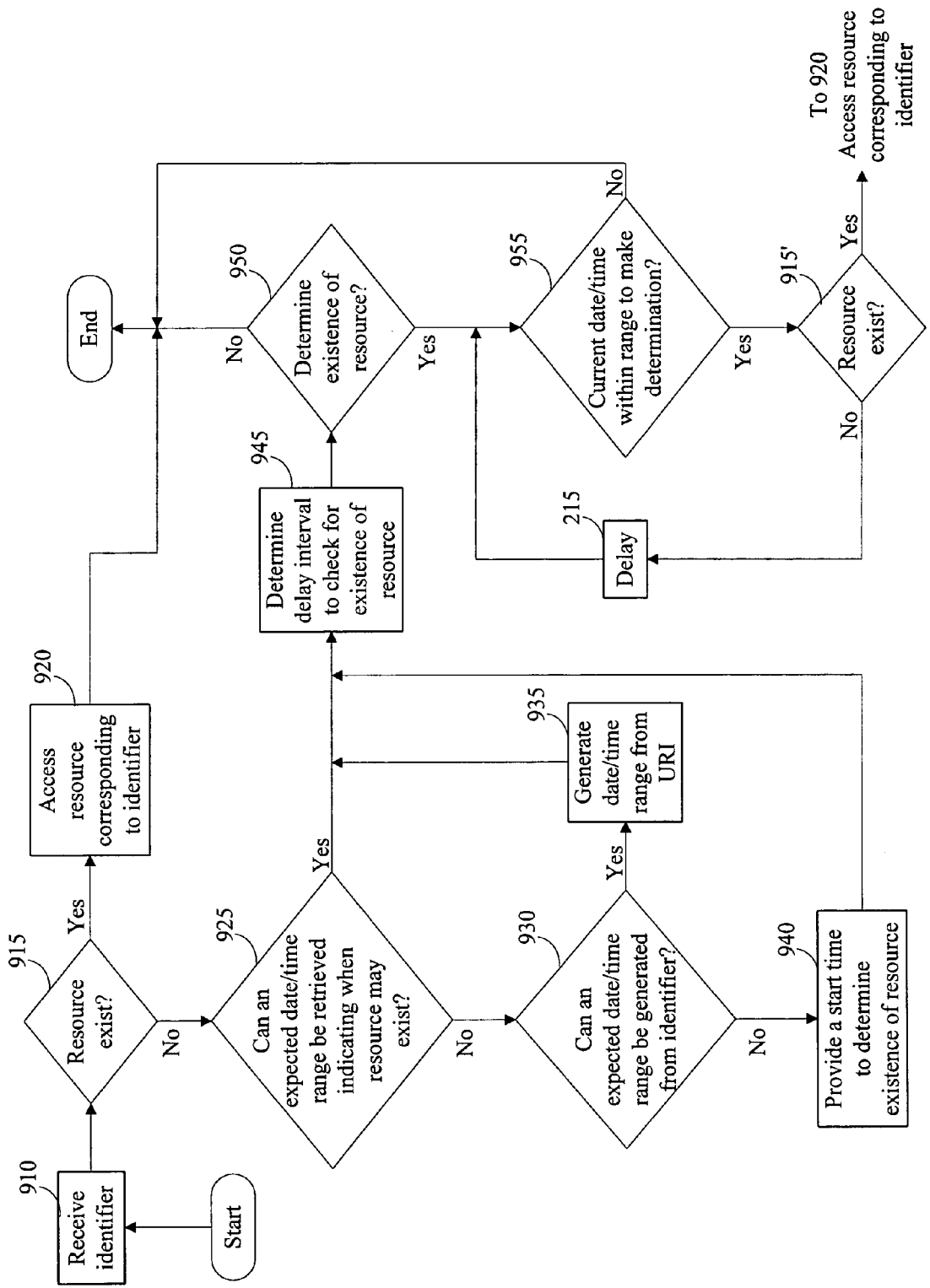
FIG. 9 is a flowchart illustrating the steps performed for notifying when at least one resource corresponding to an identifier may exist in accordance the present invention.

FIG. 9 is a flowchart illustrating the steps performed for notifying when at least one resource corresponding to an identifier may exist. An identifier may be received in step 910. When it is determined in step 915 that a resource corresponding to the identifier is accessible (e.g., provide resource access request), the resource may then be accessed in step 920. When the resource is not accessible, then it may be determined in step 925 whether an expected date/time range indicating when identifier may exist can be retrieved. When a date/time range cannot be retrieved, then it may be determined in step 930 whether an expected date/time range may be generated from the identifier. If so then a date/time range for the identifier may be generated in step 935. When the date/time range cannot be generated, then at least a start time may be provided in step 940 to determine existence of a resource corresponding to the identifier.

When a date/time range is retrieved, generated, or provided by consulting a time access method 178, then a delay interval to check for existence of a resource corresponding to the identifier may be determined in step 945. It may then be determined in step 950 whether to determine whether there a resource corresponding to the identifier may exist. If so, then it may be determined in step 955 whether the current date/time is within the date/time range of identifier to make the determination as to whether the resource corresponding to the identifier exists. When the current date/time is within the date/time range and it is determined in step 915' that a resource corresponding to the identifier is accessible, the resource may then be accessed in step 920. When the resource is not accessible, there may be a wait in step 215 for a configured predetermined interval of zero or more seconds and repeating step 955 until the resource is accessible or the current date/time is out of the date/time range.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A notification method comprising:
   receiving a request to provide notification when a new file is published to a file directory, said file directory including one or more files having a filename, file date, and file time;
   at least one of a determining a polling start time of day that is earlier than time of day of each said previously published file in said file directory, determining a polling end time of day that is later than time of day of each said previously published file in said file directory, and determining at least one of a polling interval, publishing interval, volume number, and issue number from said at least one of a filename, file date, and file time of at least two files in said file directory;
   determining when and how often to monitor whether said new file can be found in said file directory from said at least one of a polling start time, polling end time, polling interval, publishing interval, volume number, and issue number; and,
   providing said notification when it is determined that said new file can be found in said file directory.

2. The method, as set forth in claim 1, wherein said determining when and how often to monitor whether said new file can be found in said file directory includes performing a resource access request from a Uniform Resource Locator (URL) after said polling start time.

3. The method, as set forth in claim 2, wherein said resource access request includes a differencing resource method, said differencing resource method including comparing the difference from one of a plurality of file dates, file sizes, and number of files counts from said file directory.

4. The method, as set forth in claim 1, wherein said providing said notification when it is determined that said new file can be found in said file directory includes providing said notification from at least one of a hyperlink access and automatic access.

5. The method, as set forth in claim 4, wherein said hyperlink access includes selecting said hyperlink from at least one of a hyperlink determination method, hyperlink retrieval method, and hyperlink generation method.

6. The method, as set forth in claim 5, wherein said hyperlink determination method includes selecting said differencing resource method, generating at least one hyperlink corresponding to said file directory from said differencing resource method selection, and providing said notification having said hyperlink.

7. The method, as set forth in claim 6, wherein said providing said notification includes selecting a notification method corresponding to a subscriber.

8. The method, as set forth in claim 7, wherein said selecting said notification method includes selecting a notification destination from at least one of a pager, e-mail, web page, television, phone, fax, instant message, and conferencing.

9. The method, as set forth in claim 8, further including determining at least one of a polling interval, publishing interval, volume number, and issue number from said at least one of a filename, file date, and file time of at least two files in said file directory.

10. A computer program product comprising computer readable program code stored on a computer readable medium, the program code adapted to execute a notification method including receiving a request to provide notification when a new file is published to a file directory, said file directory including one or more files having a filename, file date, and file time, at least one of a determining a polling start time of day that is earlier than time of day of each said previously published file in said file directory, determining a polling end time of day that is later than time of day of each said previously published file in said file directory, and determining at least one of a polling interval, publishing interval, volume number, and issue number from said at least one of a filename, file date, and file time of at least two files in said file directory, determining when and how often to monitor whether said new file can be found in said file directory from said at least one of a polling start time, polling end time, polling interval, publishing interval, volume number, and issue number, and providing said notification when it is determined that said new file can be found in said file directory.

11. A notification method comprising:
   receiving a request to provide notification when a new file is published to a file directory, said file directory including one or more files having a filename, file date, and file time;
   determining at least one of a polling start time of day and polling end time of day from variations in time of day of at least two said previously published files in said file directory;
   determining when and how often to monitor whether said new file can be found in said file directory from said at least one of a polling start time, polling end time, polling interval, publishing interval, volume number, and issue number; and,
   providing said notification when it is determined that said new file can be found in said file directory.

12. The method, as set forth in claim 11, wherein said determining when and how often to monitor whether said new file can be found in said file directory includes performing a resource access request from a Uniform Resource Locator (URL) after said polling start time.

13. The method, as set forth in claim 12, wherein said resource access request includes a differencing resource method, said differencing resource method including comparing the difference from one of a plurality of file dates, file sizes, and number of files counts from said file directory.

14. The method, as set forth in claim 11, wherein said providing said notification when it is determined that said new file can be found in said file directory includes providing said notification from at least one of a hyperlink access and automatic access.

15. The method, as set forth in claim 14, wherein said hyperlink access includes selecting said hyperlink from at least one of a hyperlink determination method, hyperlink retrieval method, and hyperlink generation method.

16. The method, as set forth in claim 15, wherein said hyperlink determination method includes selecting said differencing resource method, generating at least one hyperlink corresponding to said file directory from said differencing resource method selection, and providing said notification having said hyperlink.

17. The method, as set forth in claim 16, wherein said providing said notification includes selecting a notification method corresponding to a subscriber.

18. The method, as set forth in claim 17, wherein said selecting said notification method includes selecting a notification destination from at least one of a pager, e-mail, web page, television, phone, fax, instant message, and conferencing.

* * * * *

UNITED STATES PATENT AND TRADEMARK OFFICE
CERTIFICATE OF CORRECTION

PATENT NO. : 6,944,658 B1
APPLICATION NO. : 09/663094
DATED : September 13, 2005
INVENTOR(S) : Eric Schneider It is certified that error appears in the above-identified patent and that said Letters Patent is hereby corrected as shown below:

ON TITLE PAGE, please delete:

Item
"Related U.S. Application Data

(60)     Provisional application No. 60/154,411, filed on Sep. 17, 1999."

ON TITLE PAGE, please insert:

Item
--Related U.S. Application Data

(63)     Continuation-in-part of U.S. patent application Ser. No. 09/440,606 filed Nov. 15, 1999, now U.S. Pat. No. 6,442,549 which is a continuation-in-part of U.S. patent application Ser. No. 08/900,437 filed Jul. 25, 1997, now U.S. Pat. No. 5,987,464.

(60)     U.S. provisional application Ser. No. 60/154,411, filed Sep. 17, 1999.--

At Column 1, Lines 7-15, please delete:

"This application for patent claims priority of U.S. Provisional Application Ser. No. 60/154,411 filed Sep. 17, 1999, by Schneider, which is herby, incorporated by reference.
    The application for patent is also related to applications and claims the benefit of:
        U.S. Pat. No. 6,442,549 filed Nov. 15, 1999, by Schneider et al; and
        U.S. Pat. No. 5,987,464 filed Jul. 25, 1997, by Schneider, which are hereby incorporated by reference."

UNITED STATES PATENT AND TRADEMARK OFFICE
CERTIFICATE OF CORRECTION

| | | |
|---|---|---|
| PATENT NO. | : 6,944,658 B1 | Page 2 of 2 |
| APPLICATION NO. | : 09/663094 | |
| DATED | : September 13, 2005 | |
| INVENTOR(S) | : Eric Schneider | |

It is certified that error appears in the above-identified patent and that said Letters Patent is hereby corrected as shown below:

and please insert the following:

--This application for patent claims the benefit of U.S. Provisional Application Ser. No. 60/154,411 filed Sep. 17, 1999, by Schneider, now abandoned, which is hereby incorporated by reference and this application is a continuation-in-part of U.S. patent application Ser. No. 09/440,606 filed Nov. 15, 1999, by Schneider et al., now U.S. Pat. No. 6,442,549 which is a continuation-in-part of U.S. patent application Ser. No. 08/900,437 filed Jul. 25, 1997 by Schneider, now U.S. Pat. No. 5,987,464, which are hereby incorporated by reference.--

Signed and Sealed this

Twenty-ninth Day of December, 2009

David J. Kappos
*Director of the United States Patent and Trademark Office*